Figure 11:
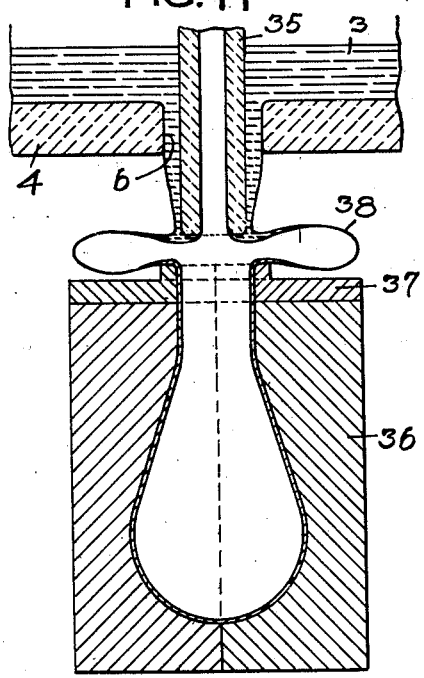

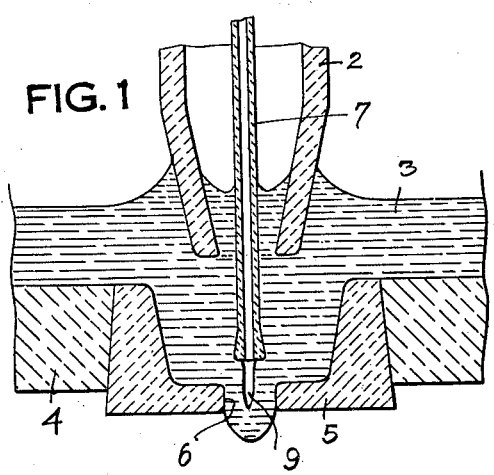
FIG. 1
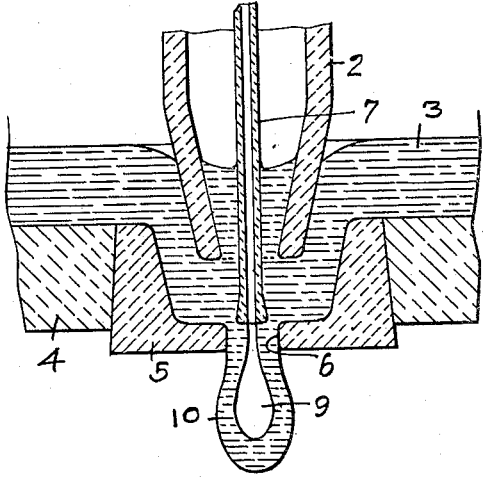
FIG. 2
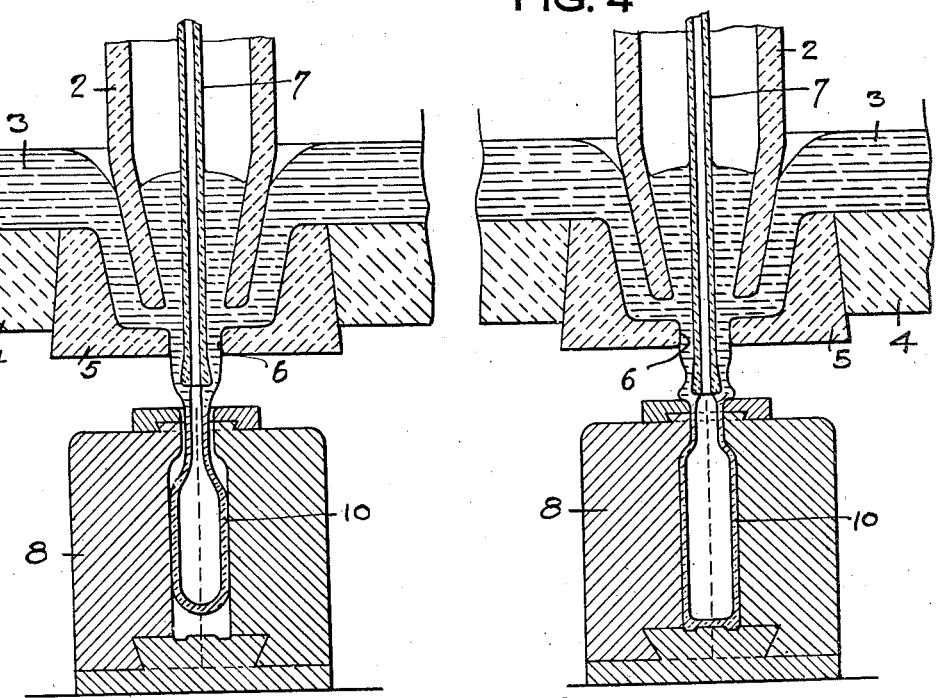
FIG. 3
FIG. 4

July 13, 1926.
G. E. HOWARD
METHOD AND APPARATUS FOR MAKING BLOWN GLASSWARE
Filed July 8, 1921  4 Sheets-Sheet 2
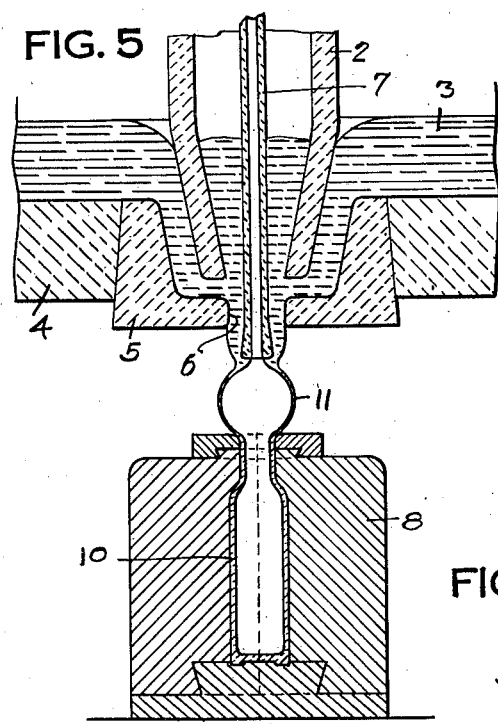
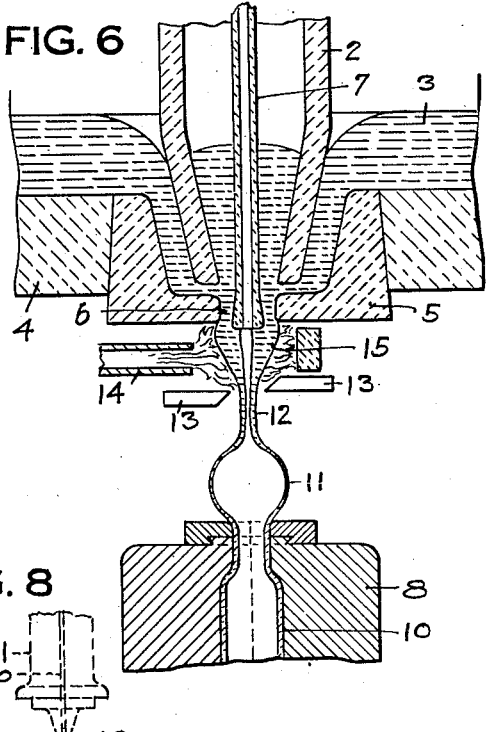
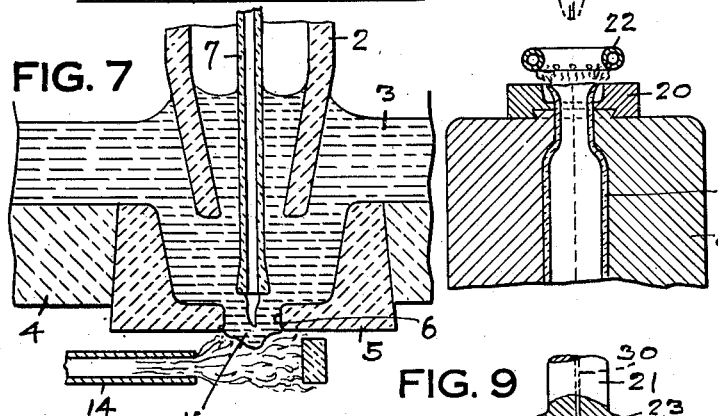
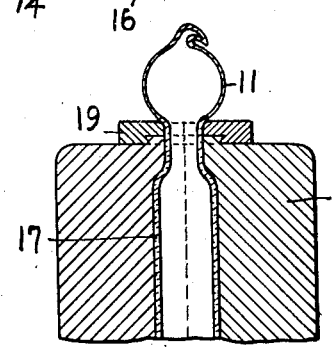
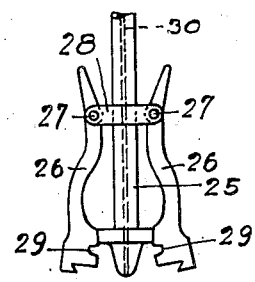
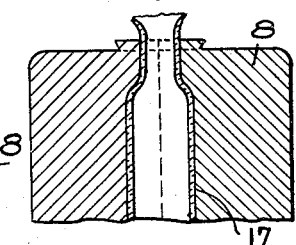
INVENTOR July 13, 1926.

G. E. HOWARD 1,592,299

METHOD AND APPARATUS FOR MAKING BLOWN GLASSWARE

Filed July 8, 1921   4 Sheets-Sheet 3

INVENTOR
George E. Howard,
By Roy, Totten Brown,
Attorneys.

July 13, 1926.
G. E. HOWARD
1,592,299
METHOD AND APPARATUS FOR MAKING BLOWN GLASSWARE
Filed July 8, 1921  4 Sheets-Sheet 4
FIG. 14
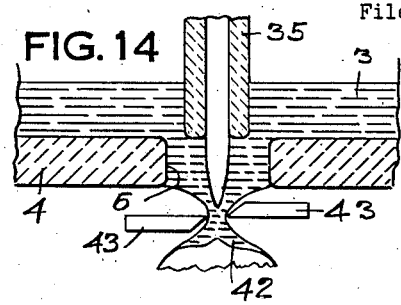
FIG. 15
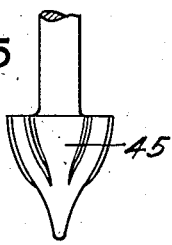
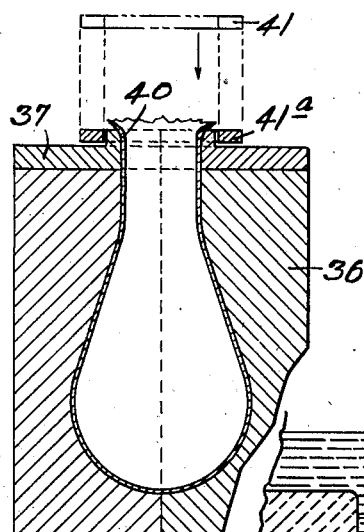
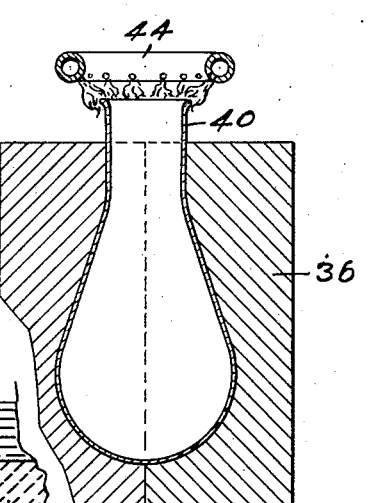
FIG. 16
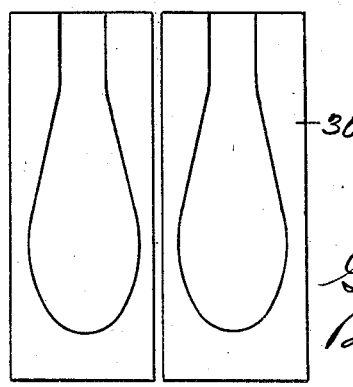
INVENTOR
George E. Howard
By Kay, Totten & Brown
Attorneys Patented July 13, 1926.

1,592,299

UNITED STATES PATENT OFFICE.

GEORGE E. HOWARD, OF BUTLER, PENNSYLVANIA, ASSIGNOR, BY MESNE ASSIGN-MENTS, TO HARTFORD-EMPIRE COMPANY, OF HARTFORD, CONNECTICUT, A CORPORATION OF DELAWARE.

METHOD AND APPARATUS FOR MAKING BLOWN GLASSWARE.

Application filed July 8, 1921. Serial No. 483,234.

My invention relates to the manufacture of blown glassware by mechanical means, and it has for one of its objects to simplify the automatic process of glass blowing known as the "blank system" and to eliminate the making of a blank as a step in the mechanical production of bottles, incandescent lamp bulbs and other blown glassware.

A second object of my invention is to improve the quality of the glassware produced.

A third object of my invention is to extend the range of sizes and weights of glassware that can be produced over what is possible in the present blank process.

A fourth object of my invention is to reduce the cost of manufacture, including the cost of molds and the cost of initial installation, maintenance, repairs and power required.

In the method at present employed for the automatic production of bottles and other blown glassware, the molten glass is gathered and pressed into a blank mold, which has a shape somewhat similar to that of the finished article and usually forms a finished neck or opening. The blank is then taken out of the mold and put in a finishing mold which is larger than the blank mold, and the blank is there blown into the final finished form.

According to my present invention the body of the bottle or other article is blown in one operation and in its finished form directly from the parent body of glass, and the neck or finish may be completed afterward.

The article may be blown up completely before being severed from the glass in the furnace tank or other receptacle, which is a radical departure from anything that has heretofore been known or used in the glass-blowing art.

The accompanying drawings illustrate two of the many ways in which my invention may be carried into effect. In these drawings, Figs. 1 to 7 are diagrammatic vertical sectional views showing the successive steps necessary to make a regular standard prescription bottle according to my invention, up to the point of finishing the neck; Figs. 8 and 9 are similar views showing one method of finishing the neck; Fig. 10 shows another method of neck finishing; and Figs. 11 to 16 inclusive show the successive steps necessary in making an incandescent lamp bulb according to my invention.

Referring first to Figs. 1 to 7, the numeral 2 indicates a hollow and vertically movable plunger having its lower end immersed in molten glass 3 contained in a suitable receptacle 4 which may be a forehearth or projection from an ordinary tank furnace, or may be any other receptacle provided with suitable means for supplying the molten glass and maintaining it at the proper temperature for working. 5 represents a mouth-piece in the bottom of the receptacle 4 having a discharge opening 6 through which the molten glass can flow by gravity or in response to an impulse action. 7 represents a blow-pipe which extends through the hollow plunger 2 and up through the cover of the forehearth where it is properly fastened and guided for vertical movement and attached to means for supplying vacuum or air pressure, the operating and guiding means and the vacuum and pressure connections being such as are well understood in the art, and being therefore not shown herein. The means for heating the forehearth and its general construction are likewise omitted, and also the means for vertically moving the plunger, as these form no part of my present invention.

Figs. 3 to 7 show a mold 8 composed of separate sections and located directly beneath the discharge outlet 6 from the receptacle 4.

The operation shown in Figs. 1 to 7 proceeds as follows: In the position shown in Fig. 1 the glass is just beginning to flow from the discharge opening 6, the plunger 2 being at its highest point and the blow-pipe may be elevated somewhat above the opening 6, or it can remain below the opening 6. A slight leakage of air into the blow-pipe 7 may be provided, causing a hollow space 9 to be formed extending down into the glass.

In Fig. 2 the plunger 2 has descended somewhat into the cup-shaped opening in the mouth-piece 5, thus forcing the glass through the discharge opening 6 to form a suspended gather 10. At the same time the blow-pipe 7 may be lowered and the air pressure may be increased, thus enlarging the opening 9 in the gather 10 and giving the gather the form of a bubble having somewhat the shape shown in Fig. 2.

Fig. 3 shows another step in forming the bottle, which consists in closing the sections 8 around the hollow gather or bubble 10. Between the stages shown in Figs. 2 and 3 the gather 10 may be allowed to stretch and elongate, and this elongation may be assisted by the continued downward movement of the plunger 2 and the blow-pipe 7.

After the forming mold 8 is closed around the depending glass the blow-pipe 7 may be lowered still farther, or the mold 8 may be raised, so as to bring the upper end of the mold and the lower end of the blow-pipe nearer to each other, as shown in Fig. 4. At this point the air pressure through the blow-pipe 7 operates to blow the drop 10 until it fills the interior of the mold 8. When this may be accomplished the mold 8 is lowered, or the air-pipe 7 raised, or both the mold and the blow-pipe may be moved, and the air pressure through the blow-pipe may be continued. The effect of this is to blow out the portion of glass between the mold 8 and the blow-pipe 7, as shown at 11 on Fig. 5, and this bubble usually breaks under the continued air pressure, though it may remain in the balloon-like form shown in Figs. 5 to 7. This balloon-like bubble, or any frayed edge that may project above the mold, will be thin like tissue paper and brittle. Before the neck-finishing operation, this may be cleaned off by means of a tool similar to the tool 39 shown in Fig. 13. In some cases the blow-over will remove itself entirely when the bubble breaks, and in any event the gas flame shown in Fig. 8 will remelt and smooth the chilled edge.

Another step consists in severing the molded article from the parent body of glass, which is accomplished as shown in Fig. 6 by lowering the mold and thus forming an attenuated neck 12 which is severed by shears 13. At the same time a gas burner 14, which may or may not have been present during the operations shown in Figs. 1 to 6, directs its flame against the stub of glass 15 remaining below the opening 6, and thus reheats the stub and keeps it in proper condition to be again incorporated in the mass of glass within the receptacle.

The movement of the plunger 2 and of the blow-pipe 7 may be so timed that both the plunger and the blow-pipe are moving upwardly when the shears sever the glass, and this upward movement of the plunger, assisted somewhat by the upward movement of the blow-pipe, checks the downward flow of the glass through the opening 6 and may even pull the stub 15 entirely up into the discharge orifice. The plunger 2, which controls the expulsion of glass through the opening 6, and the blow pipe 7 may be moved vertically at the same time, or they may be moved separately and at such times as particular conditions of operation may require. In certain cases the plunger 2 may be omitted and the entire operation carried out with the blow pipe alone, as shown in Figs. 11 to 14.

An average condition of the stub at the time when the plunger and blow pipe have returned to their uppermost position is shown at 16 in Fig. 7, the stub being at this time still kept hot by the flame of the burner 14 which removes any tendency to chilling that may result from the exposure of the stub below the opening to the cool temperature of the outside air or to the chilling effect of the severing shears. During the upward movement of the plunger and blow pipe to the position shown in Fig. 7, the air pressure in the blow pipe may be cut off, or a slight vacuum may be produced, as may be deemed suitable for properly manipulating the glass at this time. The cycle of operations is then repeated, as shown in Figs. 1 to 7. During this cycle of operations the molds are opened, closed, raised and lowered to coact with the movement of the glass forming part of the system, the arrangements for so moving and operating the mold being such as are commonly employed in automatic glass working machines, and being therefore not shown and described in detail.

Fig. 7 shows the bottle 17 in the mold 8 at the end of the blowing operation. The bottle is complete except for its neck, and the finishing of the neck may be done either manually or mechanically, and by any suitable means. Two methods of neck-finishing are shown in Figs. 8 to 10.

The bottle 17 shown in Fig. 7 happens to have the bubble of glass 11 still adhering to its upper end, although, as stated above, this bubble will usually burst during the blowing operation and will thus disappear. If the bubble still remains it is broken off by the operator or by a suitable mechanical breaker such, for example, as that shown in Fig. 13 and described below. The bottle may then be neck-finished by removing the upper portion 19 of the mold 8 and, after reheating the edge of the bottle, substituting a split neck former 20, as shown in Figs. 8 and 9. For this operation the mold may be moved from under the opening 6 in the forehearth 4 to another station or position, suitably beneath a forming tool or mandrel 21 which is of proper shape to form the neck of the bottle. A ring burner 22 may be employed to soften the edges of the bottle neck, and the forming tool 21 provided with suitable mechanism for lowering it as soon as the edges of the neck are sufficiently plastic. This downward movement of the mandrel 21 brings it into the position shown in Fig. 9, the downward movement of the tool being limited by lugs 23, and the neck of the bottle being finished as shown. The mandrel 21 may also have a rotary motion to assist the neck-finishing operation. It will be understood that the ring burner 22 will heat the neck before the neck former 20 is applied, and that the mandrel 21 is usually applied after this burner 22 is removed and the neck former placed in position.

A modified method of finishing the neck of the bottle is shown in Fig. 10 and consists in removing the upper portion 19 of the mold 8, heating the upper edges of the neck by suitable means, not shown, and then lowering into contact with the neck a forming tool which consists of a central mandrel 25 and two or more shaping arms 26 which are pivoted at 27 to a bracket 28 carried by the mandrel 25 and are maintained in the position shown in Fig. 10 by suitable springs, not shown. The mandrel 25 is rotated and moved toward and away from the mold by suitable mechanism of ordinary construction, and when lowered into contact with the mold the neck is finished or spun into its final form, the lip or flange being produced by notches 29 in the arms 26.

The mandrels 21 and 25 shown in Figs. 8, 9 and 10 are provided with lengthwise openings 30 for the admission of air pressure when necessary. When the neck of the bottle or other article is formed by means of a mandrel, as in Figs. 8 to 10, the downward pressure of the mandrel may tend to crush or distort the bottle in the mold, especially in making bottles having thick sides, such as milk bottles, which may retain considerable plasticity at the neck-forming stage. In such cases air under pressure is introduced through the opening 30 in the neck-forming mandrel, and the pressure thus applied to the inner walls of the bottle will keep the plastic walls in contact with the mold, thereby preventing the bottle from becoming distorted while the neck is being shaped.

It will be understood that the methods of neck finishing shown in Figs. 8 to 10 are merely illustrative and that any other manual or mechanical means may be employed for finishing the necks of the blown articles. In some cases where the upper or neck portion of the ware is removed during later manufacturing operations, the neck-finishing step may be omitted entirely.

Figs. 11 to 16 show one manner in which my present method may be applied in a simple and effective manner to the manufacture of incandescent lamp bulbs. As in the system shown in Figs. 1 to 7, molten glass 3 is contained within a forehearth or other receptacle 4, having a discharge opening 6. Unlike the arrangement shown in Figs. 1 to 7, however, the plunger and blow pipe are combined into a blow plunger 35 which is reciprocated by any suitable means so as to move between the lower position shown in Fig. 11 and the upper position shown in Fig. 14, where the lower end of the plunger is above the discharge opening 6.

In this method of making lamp bulbs the first steps are similar to those shown in Figs. 1 and 2, the glass being first allowed to flow from the opening, assisted by the slight air pressure within the plunger 35, and being then elongated by increasing the air pressure within the plunger and simultaneously applying an elongating impulse by lowering the plunger. Fig. 11 shows a lamp bulb mold 36, usually what is known as a paste mold, and on top of the mold 36 is a separate piece 37 which is parted like the mold 36 for opening and closing.

As in the manufacture of bottles described above, the mold is closed around the depending bubble of glass and the blow plunger is lowered or the mold is raised, or both, so as to bring the lower end of the plunger near the top of the mold. In blowing lamp bulbs, however, the blow-over may be flat, as shown at 38, so as to make it extremely thin, this shape being produced by delaying the movement of the mold toward the plunger until a blow-over of suitable size has been formed.

Figure 12:
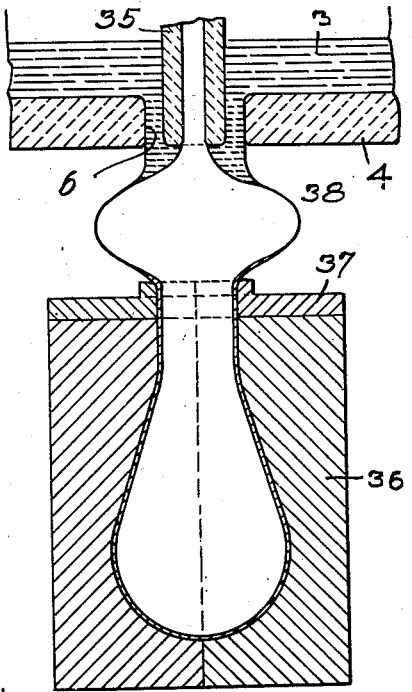
Figure 13:
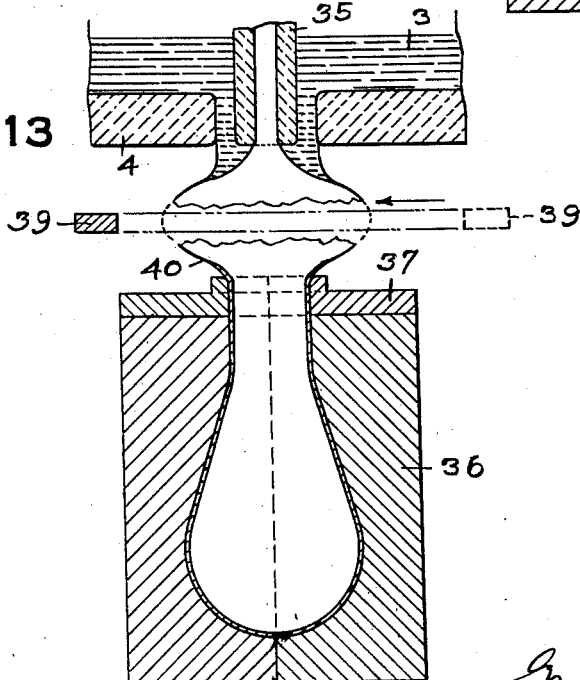

In the next stage the plunger 35 is raised and the mold 36 is quickly lowered, leaving the blow-over 38 in the form shown and of paper-like thinness. The blow-over may, and usually will, break and blow away at this point, but in order to take care of cases where the blow-over remains, as shown in Fig. 12, a breaking knife 39, shown in Fig. 13, is caused to move horizontally through the blow-over bubble 38, thus breaking off the blow-over and leaving the bulb completely blown, with a thin ragged edge 40 at the top. Following the breaking operation the broken edge 40 is trimmed, for which purpose a ring 41, shown in Fig. 14, is suddenly lowered over the projection 40 into the position 41ª, and the top of the bulb is thus sheared to a somewhat more definite and thin edge. The ring 41 may suitably be carried and operated by the same mechanism that moves the breaking knife 39 through the blow-over. The blow-over bubble 40 is so thin that it is cold and brittle the moment the glass is expanded to fill the mold, so that the breaking and trimming operation can be effected without having the coacting edges of the trimmer ring 41 and the projection 40 of the bulb in actual contact. While the neck is being trimmed the stub of cold glass 42 is severed by means of shears 43 and is discarded. The shears 43 operate upon an attenuated portion of glass which is produced by the upward movement of the plunger 35, assisted, if desired, by a slight suction within the plunger.

The operations of neck-trimming and severing shown in Fig. 14 may be carried out while the mold is still beneath the discharge orifice 6, or if desired the neck trimming may be done in another position or station.

Another stage of neck finishing is shown in Fig. 15, where the top piece 37 of the mold is removed, leaving the neck 40 protruding a considerable distance above the body of the mold. For this operation the molds may be removed to another station and a gas flame applied to the rough edges of the neck, suitably by means of a ring burner 44, in order to smooth the upper edge of the neck, which, after trimming, is still rough and sharp. This flame quickly removes the roughness and gives a fire finish to the edge. A rotary reamer 45 may now be lowered upon the neck to swell it out or remove any irregularities in its shape which may be caused by the heat. This reaming operation can be carried out during the application of the flame to the edge, or it can be done at another station later, as may be most convenient.

Fig. 16 shows the reheating of the cooled projecting glass at the orifice 6 by means of the flame of a burner 46, and also shows another mold opened in position to receive the next bubble and form the next bulb. The burner 46 may be suitably arranged so as to move beneath the orifice 6 after each severing operation.

The machines for forming blown glassware according to the method described above may be either of the rotary type, in which the molds are brought in successive stages on a table under the glass discharge opening, or the molds may be carried on a chain-type conveyer, or presented to the blow orifice in any other suitable manner.

Many modifications can be made in the shape and movement of the units used for forcing the glass through the opening and blowing up the finished product, and the method steps may be variously modified and combined within the scope of my invention, as defined in the appended claims.

I claim as my invention:

1. The method of making blown glassware that comprises directing fluid under pressure into the interior of a mass of molten glass contained in a receptacle, thereby forcing a bubble of glass to issue from the said receptacle, and enclosing said bubble of glass in a mold.

2. The method of making blown glassware that comprises causing a mass of molten glass to issue from an orifice, directing fluid under pressure through the said orifice into the interior of the said mass, thereby imparting hollow form to said mass, and enclosing said hollow mass of glass in a mold.

3. The method of making blown glassware that comprises causing a mass of molten glass to issue from an orifice, directing fluid under pressure through the said orifice into the interior of the said mass while the said mass is still attached to the parent body of glass, thereby imparting hollow form to said mass, and enclosing said hollow mass of glass in a mold.

4. The method of making blown glassware that comprises causing a mass of molten glass to issue in a suspended mass from a downwardly opening discharge orifice, directing fluid under pressure through the said orifice into the interior of the said mass while the said mass is still attached to the parent body of glass, thereby imparting hollow form to said mass, and enclosing said hollow mass of glass in a mold.

5. The method of making blown glassware that comprises causing a mass of molten glass to issue from an orifice, directing fluid under pressure through the said orifice into the interior of the said mass while the said mass is still attached to the parent body of glass and simultaneously applying an elongating impulse to the said mass from above, thereby assisting in forcing the glass through the said orifice.

6. The method of making blown glassware that comprises causing a mass of molten glass to issue in a suspended mass from a downwardly opening discharge orifice, directing fluid under pressure through the said orifice into the interior of the said mass while the said mass is still attached to the parent body, and simultaneously applying an elongating impulse to the said mass from above, thereby assisting in forcing the glass through the said orifice.

7. The method of making blown glassware that comprises causing molten glass to issue from a discharge orifice and blowing the said glass in a blow mold by fluid pressure applied through the said orifice and while the mass is still attached to the parent body of glass.

8. The method of making blown glassware that comprises causing molten glass to issue in a suspended mass from a downwardly opening discharge orifice and blowing the said suspended mass in a blow mold by fluid pressure applied through the said orifice and while the mass is still attached to the parent body of glass.

9. The method of making blown glassware that comprises causing molten glass to issue in a suspended mass from a downwardly opening discharge orifice, directing fluid under pressure through the said orifice into the interior of the said mass while the said mass is still attached to the parent body of glass, receiving in a mold the bubble of glass so formed, and continuing the application of fluid pressure to the interior of the said bubble of glass to cause the said bubble to conform to the shape of the mold.

10. The method of making blown glassware that comprises directing fluid under pressure through a discharge orifice in a receptacle containing molten glass, thereby causing the glass to issue from the said orifice in the form of a hollow drop or bubble, surrounding the said bubble of glass by a mold, and continuing the application of fluid pressure to the interior of the said bubble of glass to cause the bubble to conform to the shape of the mold.

11. The method of making blown glassware that comprises causing a mass of molten glass to issue from an orifice, directing fluid under pressure through the said orifice into the interior of the said mass while the said mass is still attached to the parent body of glass and simultaneously applying an elongating impulse to the said mass, thereafter receiving in a mold the bubble of glass so formed, and continuing the application of fluid pressure to cause the said bubble to conform to the shape of the mold.

12. The method of making blown glassware that comprises causing molten glass to issue in a suspended mass from a downwardly opening discharge orifice, directing fluid under pressure through the said orifice into the interior of the said mass while the said mass is still attached to the parent body of glass, and simultaneously applying an elongating impulse to the said mass, thereafter receiving in a mold the bubble of glass so formed, and continuing the application of fluid pressure to cause the said bubble to conform to the shape of the mold.

13. The method of making blown glassware that comprises directing fluid under pressure through a discharge orifice in a receptacle containing molten glass, thereby causing the glass to issue from the said orifice in the form of a hollow drop or bubble, surrounding the said bubble of glass by a mold, continuing the application to the interior of the said bubble of glass to cause the bubble to conform to the shape of the mold, and severing the molded article from the parent body of molten glass.

14. The method of making blown glassware that comprises directing fluid under pressure through a downwardly opening discharge orifice in a receptacle containing molten glass, thereby causing the glass to issue from the said orifice in the form of a suspended hollow drop or bubble, applying an elongating impulse to the said glass in addition to the said fluid pressure, surrounding the said bubble of glass by a mold, continuing the application of fluid pressure to the interior of the said bubble of glass to cause the said bubble to conform to the shape of the mold, and severing the said bubble from the parent body of molten glass.

15. The method of making blown glassware that comprises directing fluid under pressure through a downwardly opening discharge orifice in a receptacle containing molten glass thereby causing the glass to issue from the said orifice in the form of a hollow drop or bubble, surrounding the said bubble of glass by a mold, continuing the application of fluid pressure to the interior of the said bubble of glass causing the bubble to conform to the shape of the mold, severing the blown article from the parent body of molten glass, and shaping the neck of the said article.

16. The method of making blown glassware that comprises directing fluid under pressure through a downwardly opening discharge orifice in a receptacle containing molten glass, thereby causing the glass to issue from the said orifice in the form of a suspended hollow drop or bubble, applying to the glass an elongating impulse in addition to the said fluid pressure, surrounding the said bubble of glass in a mold, continuing the application of fluid pressure to the interior of the said bubble of glass to cause the bubble to conform to the shape of the mold, severing the blown article from the parent body.

17. The method of making blown glassware that comprises blowing glass to form an article directly from a supply receptacle into a blow-mold and severing the blown article from the parent body of molten glass.

18. The method of making blown glassware that comprises blowing glass to form an article directly from a supply receptacle into a blow-mold, severing the blown article from the parent body of molten glass, reheating the severed edge of the said article and shaping the said edge.

19. The method of making blown glassware that comprises blowing glass to form an article directly from a supply receptacle into a blow-mold, severing the blown article from the parent body of molten glass, and trimming the severed edge of the said article.

20. Apparatus for making blown glassware comprising a receptacle for molten glass, means for directing fluid under pressure into the interior of the glass contained in the said receptacle and for thereby causing a bubble of glass to issue from the said receptacle, and a mold for enclosing the bubble of glass so produced.

21. Apparatus for making blown glassware comprising a receptacle for molten glass having a discharge orifice, means for directing fluid under pressure through the said orifice and into the interior of the glass issuing therefrom, and a mold for inclosing the hollow mass of glass so produced.

22. Apparatus for making blown glassware comprising a receptacle for molten glass having a downwardly opening discharge orifice, means for expelling glass through the said orifice, means for directing fluid under pressure into the said glass while being expelled through the said orifice, and a mold for enclosing the issued glass.

23. Apparatus for making blown glassware comprising a receptacle for molten glass having a downwardly opening discharge orifice, a plunger adapted to reciprocate toward and from the said orifice to produce an intermittent or pulsating flow of glass therethrough, and means for directing fluid under pressure through the said plunger and into the glass below the said orifice.

24. Apparatus for making blown glassware comprising a receptacle for molten glass having a downwardly opening discharge orifice, a plunger adapted to reciprocate toward and from the said orifice and a blow pipe contained within the said plunger.

25. Apparatus for making blown glassware comprising a receptacle for molten glass having a downwardly opening discharge orifice, a plunger adapted to reciprocate toward and from the said orifice, and a blow pipe contained within the said plunger and reciprocable independently of the said plunger.

26. Apparatus for making blown glassware comprising a receptacle for molten glass having a downwardly opening discharge orifice, means for blowing a glass article through the said orifice, means for shaping the said article while it is still attached to the parent body of glass, and a mold for enclosing the hollow mass of glass so produced.

27. Apparatus for making blown glassware comprising a receptacle for molten glass having a downwardly opening discharge orifice, means for directing fluid under pressure through the said orifice into the interior of the glass issuing from the said orifice while the said glass is still attached to the parent body of glass, and a mold for enclosing the hollow mass of glass so produced.

28. Apparatus for making blown glassware comprising a receptacle for molten glass having a downwardly opening discharge orifice, a blow mold, and means for causing a mass of glass to issue from the said orifice and for blowing the said mass in the said mold while the said glass is still attached to the parent body of glass.

29. Apparatus for making blown glassware comprising a receptacle for molten glass having a downwardly opening discharge orifice, means for causing glass to issue in a suspended mass from the said orifice, a blow-mold, and means for blowing the said mass in the said mold while the said mass is still attached to the parent body of glass.

30. Apparatus for making blown glassware comprising a receptacle for molten glass having a downwardly opening discharge orifice, means for directing fluid pressure from the interior of the said receptacle through the said discharge orifice, a blow-mold, and means for moving the said blow-mold toward and away from the said orifice.

31. Apparatus for making blown glassware comprising a receptacle for molten glass having a downwardly opening discharge orifice, and a blow pipe adapted to reciprocate through the said orifice from the interior of the said receptacle.

32. Apparatus for making blown glassware comprising a receptacle for molten glass having a downwardly opening discharge orifice, a blow-mold, means for directing fluid under pressure through the said orifice from the interior of the said receptacle, and severing means disposed between the said receptacle and the said mold.

33. Apparatus for making blown glassware comprising a receptacle for molten glass having a downwardly opening discharge orifice, a blow-mold, means for directing fluid under pressure through the said orifice from the interior of the said receptacle, severing means disposed between the said receptacle and the said mold, and means for reheating the stub of glass protruding from the said orifice after severing.

34. Apparatus for making blown glassware that comprises a receptacle for molten glass, a mold, and means for blowing glass from said receptacle into said mold while the glass is still attached to the parent body of glass contained within the receptacle.

35. Apparatus for making blown glassware comprising means for blowing glass to form an article in a mold while the article is still attached to a parent body of molten glass contained within a receptacle, and means for severing the blown article from the parent body.

36. Apparatus for making blown glassware comprising means for blowing glass to form an article in a mold while the article is still attached to the parent body of glass contained within the receptacle, means for severing the blown article from the parent body, and means for finishing the neck of the said article.

37. Apparatus for making blown glassware comprising means for blowing glass to form an article in a mold while the article is still attached to the parent body of glass contained within the receptacle, means for severing the blown article from the parent body, and means for fire-finishing and shaping the neck of the said article.

38. Apparatus for making blown glassware that comprises means for blowing glass to form an article directly from a supply receptacle into a blow-mold, and means for trimming the edge of the said article after the article is severed from the parent body of molten glass.

39. The method of making blown glassware, that comprises causing molten glass to issue from an orifice, and blowing the said glass in a blow mold by fluid pressure applied through the said orifice.

40. The method of making blown glassware, that comprises causing molten glass to issue in a suspended mass from a downwardly opening orifice, and blowing the said suspended mass in a blow mold by fluid pressure applied through the said orifice.

41. The method of making bulbs for incandescent electric lamps, that comprises superposing a mass of molten glass above a downwardly opening orifice, permitting the glass to descend by gravity through said orifice to form a depending mass, and expanding said mass of glass in a mold by blowing air downwardly through the said orifice.

42. The method of making blown glassware, the comprises causing molten glass to issue in a suspended mass from a downwardly opening orifice, directing fluid under pressure through said orifice into the interior of the said mass of glass, receiving the said glass in a mold, and expanding the said glass by fluid pressure applied through said orifice.

43. The method of making bulbs for incandescent electric lamps, that comprises superposing a mass of molten glass above a downwardly opening orifice, permitting the glass to descend by gravity through the said orifice to form a depending mass, blowing air downwardly through said orifice and thereby elongating and partially expanding the said depending mass of glass, closing a mold around said partially expanded mass, and blowing additional air through the said orifice to expand the glass to conform to the said mold.

44. Apparatus for making blown glassware, comprising a support for a supply of molten glass, the said support having an orifice for the issue of glass from said supply, a mold for enclosing the glass issuing from said orifice, and means for directing fluid under pressure through said orifice into the said glass while the said glass is enclosed in the said mold.

45. Apparatus for making blown glassware, comprising a support for a supply of molten glass, the said support having a downwardly opening orifice for the issue of glass from said supply, a mold for enclosing the glass issuing from said orifice, and a blowpipe for blowing air through the said orifice into the interior of the said glass while the said glass is enclosed in the said mold.

46. Apparatus for making blown glassware, comprising a support for a supply of molten glass, the said support having a downwardly opening orifice for the issue of glass from said supply, a mold for enclosing the glass issuing from said orifice, a blowpipe for blowing air through the said orifice into the interior of the said glass while the said glass is enclosed in the said mold, and a burner for directing flame upwardly upon the glass emerging from said orifice.

47. Apparatus for making blown glassware, comprising a support for a supply of molten glass, the said support having a downwardly opening orifice for the issue of glass from said supply, a mold for enclosing the glass issuing from said orifice, and a blowpipe movable vertically toward and away from said orifice for blowing air through the said orifice into the interior of the said glass while the said glass is enclosed in the said mold.

48. Apparatus for making blown glassware, comprising a support for a supply of molten glass, the said support having a downwardly opening orifice for the issue of glass from said supply, a conveyor movable beneath said orifice, a mold carried by said conveyor for enclosing glass issuing from the said orifice, and a blowpipe for blowing air through the said orifice into the interior of the issued glass while said glass is enclosed in said mold.

49. The method of making blown glassware that comprises expanding a body of plastic glass in a blow mold by air pressure, while said glass is connected to a supply of molten glass in a container from which said body has been derived.

50. The method of forming a blown glass article that comprises causing molten glass, while connected with a source of molten glass supply in a melting tank or other container, to descend through a shaping orifice to form a hollow parison, and then expanding the said parison by air pressure in a blow mold while the glass composing said parison is still connected to the said source of molten glass supply.

51. The method of forming a blown glass article that comprises causing molten glass, while connected with a source of molten glass supply, to descend through a shaping orifice to form a hollow parison, then expanding the said parison by air pressure in a blow mold while the glass composing said parison is still connected to the said source of molten glass supply and rotating the said blow mold during said expanding operation.

52. The method of making blown glassware that comprises placing molten glass above a shaping opening, then causing the said glass to descend through the said opening, then lowering a blow head to operative position adjacent to said opening, receiving the issued glass in a mold, and then blowing air through said blow head to expand said glass in said mold while the said glass is still connected to the glass above the said shaping opening.

53. The method of making blown glassware that comprises causing molten glass connected to a supply body of molten glass to issue downwardly through a shaping orifice, then lowering a blow head to operative position adjacent to said orifice, receiving the issued glass in a mold, then expanding said glass in said mold by blowing air through said blow head, and rotating said mold during the said expanding operation, the issued glass being connected to the glass above the said shaping orifice during said expanding operation.

54. The method of forming a blown glass article that comprises causing molten glass to flow from a supply reservoir through a flow orifice and, while the issued glass is still connected with the glass in the reservoir, expanding the same by air pressure in a blow-mold.

55. The method of forming a blown glass article that comprises causing molten glass to flow from a supply reservoir through a flow orifice and, while the issued glass is still connected with the glass in the reservoir, expanding the same by air pressure in a blow-mold, and rotating said blow-mold during the expanding operation.

In testimony whereof, I the said GEORGE E. HOWARD have hereunto set my hand.

GEORGE E. HOWARD.